Dec. 21, 1965   D. A. HAUSMANN ETAL   3,224,797
INTERNAL JOINT BAND FOR DOUBLE BELL CONCRETE PIPE
Filed May 4, 1962

DELBERT A. HAUSMANN
WILLIAM MILLER
INVENTORS

BY

ATTORNEYS

United States Patent Office 3,224,797
Patented Dec. 21, 1965

3,224,797
INTERNAL JOINT BAND FOR DOUBLE BELL CONCRETE PIPE
Delbert A. Hausmann, Glendale, and William Miller, La Habra, Calif., assignors to American Pipe and Construction Co., South Gate, Calif., a corporation of California
Filed May 4, 1962, Ser. No. 192,529
1 Claim. (Cl. 285—288)

This invention has to do with internal bands for use in making up the joints of double bell or bell-ended high pressure concrete pipe sections.

Internal joint bands are sometimes used in joining concrete pipe sections which have an internal recess or are otherwise belled at each end. Such joint bands extend axially into the adjacent ends of two pipe sections and are provided with two peripheral grooves for receiving gaskets or seal rings which sealingly engage the bell ends respectively of the two pipe sections. Joint bands may be constructed of a cylindrical section of steel lined with cement mortar for protection against internal corrosion. However, the thickness required of the cement mortar lining is such that the over-all band is so thick as to make this construction objectionable, especially for small diameter pipe, since the bell ends of the pipe sections must necessarily be made unduly large to accommodate the ring. Also, steel bands with various internal coatings to prevent corrosion have been utilized, but these are subject to being damaged and have not proved satisfactory.

An object of the present invention is to provide a novel internal joint band for use in joining double bell end concrete pipe sections which does not have the disadvantages of internal joint bands such as those described above and others of conventional construction.

A particular object is to provide a novel internal joint band which is relatively thin, yet is strong, durable and corrosion proof.

A further object is to provide a novel joint band for use as described embodying a steel band and an internal body of cement mortar reinforced with asbestos fibers together with a membrane of moisture impervious material between the band and body which is bonded to the band and mechanically locked to the body.

Another object is to provide such a band in which the body has a relatively low modulus of elasticity and relatively high tensile strength.

A further object is to provide a novel method of manufacturing a band of the type disclosed herein and also a novel method of making cement asbestos articles of annular form.

These and other objects will be apparent from the drawing and the following description. Referring to the drawing.

Figure 1:
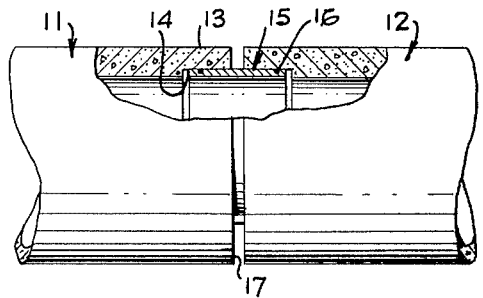
FIG. 1 is a fragmentary view of adjacent ends of two pipe sections partially broken away to show an internal joint band in place therein.

More particularly describing the invention, in FIG. 1 the adjacent ends of two concrete pipe sections designated 11 and 12 are shown. Each of these is provided with a bell end portion 13 which is characterized by an internal counterbore-like surface or reces 14. In some pipes the end sections may be belled outwardly to provide sufficient wall thickness. A joint band 15 embodying the invention is shown extending into the recessed ends of the two pipe sections. A seal ring 16 of rubber, plastics or other suitable material is employed between each end section of the pipe and the joint band. The annular groove 17 is subsequently filled with mortar.

Figure 3:
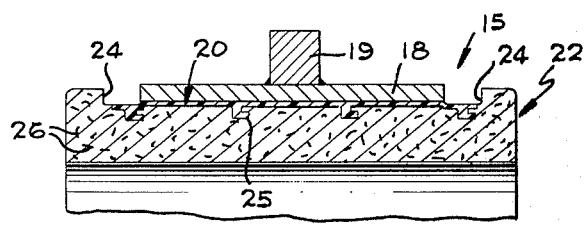
FIG. 3 is an enlarged cross sectional view through one portion of the joint band of FIG. 2.
Figure 2:
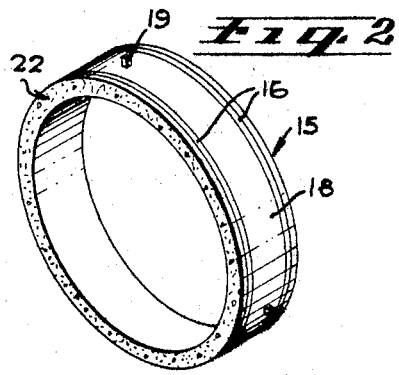
FIG. 2 is an isometric view of a joint band embodying the invention.

Referring now to FIGS. 2 and 3, the joint band 15, in general, comprises a steel band 18, a moisture impervious sheet or membrane 20, and a cement mortar body 22. Band 18 is generally cylindrical in form and is shown as provided with three or more projections 19 disposed centrally of its outer surface for the purpose of limiting the movement of the two pipe sections toward each other during assembly of the joints.

Immediately adjacent the inner surface of the steel band we provide the moisture impervious barrier sheet or membrane 20 and in the form of the invention illustrated, this extends completely across the inner surface of the band and laterally or axially therebeyond. Preferably, this membrance is made of a suitable plastics and by way of example, it may be a polyvinyl chloride. This membrane is cemented or bonded to the internal surface of the band 18 by a suitable adhesive or bonding agent. The joint band further includes an inner body 22 of cement mortar, and this also extends axially beyond the edges of the steel band and is shaped to cooperate with the band to define grooves 24. The membrane 20 is provided with knobs or projections 25 or some other type of inner surface adapted to become embedded in or interlock with the body 22 at the time the latter is cast. The projections shown are undercut and distributed in spaced relation over the inner surface of the membrane. It will be noted that the membrane forms a large part of the inner wall of the grooves 24.

The inner body 22 is preferably reinforced by asbestos fibers 26 which are arranged at random throughout the body rather than being oriented in any particular manner. The fibers may vary in length. We have found that a body comprised, by weight, of about 60% Portland cement, about 30% plaster sand and about 10% of asbestos fibers, produces a cement mortar body having a low modulus of elasticity and high tensile strength, however, this ratio is not critical and we contemplate that various mixes may be used successfully to make the inner body.

Figure 4:
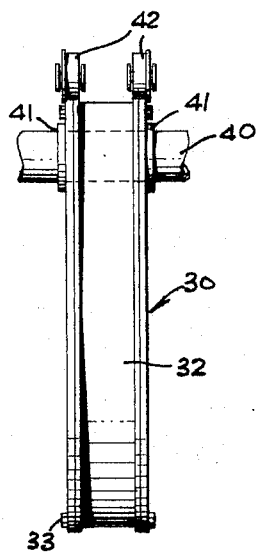
FIG. 4 is an elevational view of a mold shown supported on a drive shaft such as used in the preferred method of casting the cement mortar body of the band.
Figure 5:
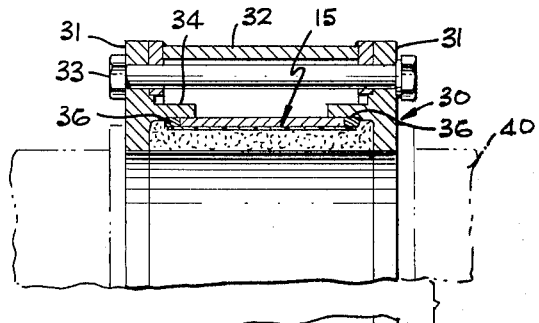
FIG. 5 is an enlarged fragmentary cross sectional view through the mold of FIG. 4.
Figure 5:
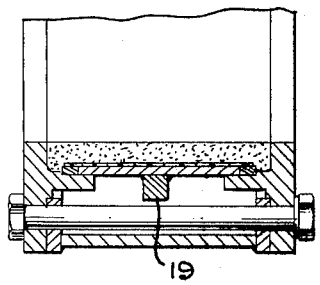

One of the features of the invention is the method of making the composite joint band by what may be termed the roller suspension method. Referring to FIGS. 4 and 5, we show a mold 30 which is used in casting the cement mortar body within the steel band. The mold comprises side rings 31, an outer collar or spacer ring 32, and bolts 33 detachably securing the rings together. The side rings 31 have internal cylindrical flanges 34 to support the joint band 18 which forms the outer wall of the mold cavity. A pair of ring inserts 36 are provided in the mold to form the two seal ring grooves 24.

The mold 30 is suspended upon a motor-driven shaft 40 between two collars 41 fixed thereto which restrain the mold against migrating axially of the shaft. A pair of hold-down rollers 42 are provided above the shaft and these bear upon the mold to hold it in place and to exert additional packing pressure as required.

In the molding operation, the shaft 40 is driven so as to rotate the mold at a moderate speed, that is, at a speed sufficient to retain the mix but considerably slower than the speeds used in centrifugal molding processes. The mold peripheral speed may well be in the range of from 500 to 1000 feet per minute. The cement mortar mix is added to the mold as the same rotates and the shaft then serves to roll and compact the mix as well as rotate the mold. In this process, a dense body of cement mortar is formed in which the asbestos fibers are disposed at random. An advantage of the roller suspension process is that it enables the use of relatively dry mixes with consequent improved strength characteristics. The water cement ratio for the example given should be of the order of about 0.27.

The joint band described above has several advantageous features: it does not require internal pointing of the joint because no steel is exposed inside the pipe; cracks in the cement mortar body do not affect the performance of the band since internal corrosion of the steel band is prevented by the plastic membrane; and superficial damage to the edges of the cement mortar body will not affect the efficiency of the joint since hydrostatic pressure in the pipe line forces the resilient gaskets hard against the steel band and away from the edges of the cement mortar body.

Although we have shown and described a preferred form of band and a preferred method of making the same, we contemplate that various changes and modifications can be made without departing from the invention, the scope of which is indicated by the claim which follows. By way of example, we contemplate that other types of fibrous material can be used in place of asbestos, such, for example, as fibers of glass and of various plastics including nylon and polyethylene.

We claim:

An internal joint band for double bell concrete pipe, comprising a steel band of cylindrical form, a cylindrical body of cement mortar within said band projecting axially beyond the edges of the band and provided with end flanges whereby said body and said band together define a peripheral seal ring groove immediately adjacent each edge of the band, and a moisture impervious cylindrical membrane bonded between and to said band and said body, said membrane extending axially beyond the edges of said band and forming the bottom wall of said grooves.

References Cited by the Examiner
UNITED STATES PATENTS

| | | | |
|---|---|---|---|
| 1,216,317 | 2/1917 | Hirst | 285—370 |
| 1,484,355 | 2/1924 | Moir | 285—370 |
| 1,913,779 | 6/1933 | Ukropina | 285—288 |
| 2,234,643 | 3/1941 | Grant | 285—369 |
| 2,719,348 | 10/1955 | Desnos | 25—154 |
| 2,729,873 | 1/1956 | Ludwig | 25—154 |
| 2,816,323 | 12/1957 | Munger. | |
| 2,829,910 | 4/1958 | Miller | 285—370 |
| 2,896,976 | 7/1959 | Wiltse | 285—230 |
| 2,900,199 | 8/1959 | Logan | 285—370 |

FOREIGN PATENTS

| | | |
|---|---|---|
| 61,645 | 12/1954 | France. |
| 235,652 | 6/1925 | Great Britain. |
| 731,165 | 6/1955 | Great Britain. |

CARL W. TOMLIN, *Primary Examiner.*

THOMAS F. CALLAGHAN, *Examiner.*